United States Patent
Huang et al.

(10) Patent No.: US 10,045,069 B2
(45) Date of Patent: Aug. 7, 2018

(54) INTERACTIVE METHOD AND SYSTEM OF MOBILE DEVICE AND TELEVISION, COMPUTER-READABLE MEDIUM

(71) Applicant: SHENZHEN SKYWORTH-RGB ELECTRONIC CO., LTD., Guangdong (CN)

(72) Inventors: Qiang Huang, Guangdong (CN); Dingmin Yu, Guangdong (CN); Hongyu Li, Guangdong (CN); Weiji Chen, Guangdong (CN)

(73) Assignee: SHENZHEN SKYWORTH-RGB ELECTRONIC CO., LTD., Guangdong (CN)

( * ) Notice: Subject to any disclaimer, the term of this patent is extended or adjusted under 35 U.S.C. 154(b) by 63 days.

(21) Appl. No.: 15/106,112

(22) PCT Filed: Jan. 3, 2014

(86) PCT No.: PCT/CN2014/070107
§ 371 (c)(1),
(2) Date: Jun. 17, 2016

(87) PCT Pub. No.: WO2015/089913
PCT Pub. Date: Jun. 25, 2015

(65) Prior Publication Data
US 2016/0366473 A1    Dec. 15, 2016

(30) Foreign Application Priority Data

Dec. 20, 2013  (CN) .......................... 2013 1 0714157

(51) Int. Cl.
*H04N 21/4363* (2011.01)
*H04N 21/41* (2011.01)
(Continued)

(52) U.S. Cl.
CPC ... *H04N 21/43637* (2013.01); *H04N 21/4122* (2013.01); *H04N 21/4126* (2013.01);
(Continued)

(58) Field of Classification Search
CPC ......... H04N 21/43637; H04N 21/4122; H04N 21/4126; H04N 21/41407;
(Continued)

(56) References Cited

U.S. PATENT DOCUMENTS

2003/0154492 A1* 8/2003 Falvo ................. H04N 5/44543
725/113
2010/0192183 A1* 7/2010 Hu ......................... H04N 7/165
725/62
(Continued)

FOREIGN PATENT DOCUMENTS

CN      102572541 A      7/2012
CN      102790907 A      11/2012

OTHER PUBLICATIONS

International Search Report issued in connection with International patent application No. PCT/CN2014/070107, dated Sep. 28, 2014, 2 pages.

*Primary Examiner* — Chenea Smith
(74) *Attorney, Agent, or Firm* — Duane Morris LLP

(57) ABSTRACT

In one aspect of the invention, an interactive method of a mobile device and a television for displaying content on the mobile device according to that displayed on the television and/or controlling the television by the mobile device includes searching a television in a network initiated from a mobile device and establishing a connection of the mobile device to the television, obtaining media information of content currently displayed on the television, obtaining basic information and a related content resource of the media information from a cloud server, and displaying the basic
(Continued)

information and the related content resource of the media information on an interface of the mobile device.

18 Claims, 6 Drawing Sheets

(51) Int. Cl.
*H04N 21/414* (2011.01)
*H04N 21/442* (2011.01)
*H04N 21/422* (2011.01)
*H04N 21/438* (2011.01)
*H04N 21/63* (2011.01)

(52) U.S. Cl.
CPC . *H04N 21/41407* (2013.01); *H04N 21/42204* (2013.01); *H04N 21/4383* (2013.01); *H04N 21/44231* (2013.01); *H04N 21/632* (2013.01)

(58) Field of Classification Search
CPC ......... H04N 21/42204; H04N 21/4383; H04N 21/44231; H04N 21/632
See application file for complete search history.

(56) References Cited

U.S. PATENT DOCUMENTS

| | | | |
|---|---|---|---|
| 2011/0162004 A1 | 6/2011 | Yerli | |
| 2012/0166655 A1* | 6/2012 | Maddali | G06F 9/547 709/228 |
| 2014/0237494 A1* | 8/2014 | Han | H04H 60/23 725/5 |

* cited by examiner

INTERACTIVE METHOD AND SYSTEM OF MOBILE DEVICE AND TELEVISION, COMPUTER-READABLE MEDIUM

CROSS-REFERENCES TO RELATED APPLICATIONS

This application is a United States national phase application of co-pending international patent application number PCT/CN2014/070107, filed on Jan. 3, 2014 which claims priority to a Chinese patent application No. 201310714157.6 filed on Dec. 20, 2013, disclosures of both of which are incorporated herein by reference in their entireties.

FIELD OF THE INVENTION

The present invention relates generally to information processing, and more particularly to interactive system and method of a mobile device and a television for displaying content on the mobile device according to that displayed on the television and/or controlling the television by the mobile device, and a non-transitory computer-readable medium storing instructions which, when executed by one or more processors, cause the interactive system to perform the interactive method.

BACKGROUND OF THE INVENTION

With rapid development of television technologies, the television industry undergoes network television and smart television stages, and has entered an age of cloud televisions. However, many people watch television programs alone, which make them lonely and bored. The lack of fun in watching the television programs may even keep them away from televisions. A method to re-attract users and persistently keep the users is urgently demanded in the television field. Currently, many companies have developed television social software installed on smart mobile devices (such as mobile phones and PADs), and use the smart mobile devices as a secondary screen of the television, expecting to achieve the above goals.

Existing television social software falls into two categories. For a first category, after watching a certain program of a television station, a user can search for the station and the program in the software, and can obtain relevant information introduction and an extended content of the program. However, the software is not intelligent enough and what program the user watches cannot be automatically acquired. For a second category, the software can identify, through a voiceprint or a station logo, what program is currently displayed on the television, and can automatically display relevant information introduction and an extended content of the program for the user. Although the software does not require the user to actively search for the program, it is limited by the distance and its identification may be inaccurate.

Moreover, the two categories of television social software have some common disadvantages as follows.

Generally, the back server of the television social software contains only electronic program guide (EPG) information, so that the television social software can obtain relevant information only about a current live television program by time and television station querying to obtain the EPG information. During network movie and music playing, webpage browsing, and APP software login, since the back server of the television social software does not have data of these network resources, the television social software cannot display and extend the information. In this case, both the two categories of television social software have the defect of being incapable of enabling the secondary screen to vary along with the television content.

In addition, television social software based on live television programs cannot control the progress of a program, e.g., the content and its next content. This type of software rarely has the capability of remotely controlling a television. In the view of a cloud television, which has lots of complicate functions, it is very inconvenient for the user to operate a television. Therefore, the two categories of television social software fail to fundamentally solve the problems in remote control of a television.

Therefore, a heretofore unaddressed need exists in the art to address the aforementioned deficiencies and inadequacies.

SUMMARY OF THE INVENTION

The present invention provides an interactive system and an interactive method of a mobile device and a television for displaying content on the mobile device according to that displayed on the television and/or controlling the television by the mobile device, and a non-transitory computer-readable medium storing instructions which, when executed by one or more processors, cause the interactive system to perform the interactive method.

According to the invention, a mobile device can actively obtain media information about a television, and then display basic information, a brief introduction, and a relevant content of the media information. Even if the television content changes, new media information can be immediately pushed to the mobile device, so that the display of the mobile device varies along with the television content.

In addition, the mobile device can always stay as a secondary screen (i.e., content display of the mobile device is based on the state of the television content), keeping up with the television without the exception that the mobile device is not in the secondary screen state.

Further, the mobile device can achieve some basic functions of a remote controller, and in the interactive method and system of the present invention, the user can conveniently control the television without a traditional remote controller in hand, and can really enjoy the fun brought about by the television.

In one aspect, the invention relates to an interactive system of a mobile device and a television. In one embodiment, the system includes a mobile device display control module associated with the mobile device, a television service management module associated with the television, and a cloud server. The mobile device display control module, the television service management module and the cloud server are in communications with each other for displaying content on the mobile device according to that displayed on the television and/or controlling the television by the mobile device.

In one embodiment, the television service management module includes (a) a terminal connection management unit for managing connection and disconnection of the mobile device to the television and controlling the number of the mobile devices connecting to the television, (b) a broadcast receiving management unit for processing a broadcast generated due to a change of content displayed on the television, (c) a media information management unit including an information processing unit for processing a request command sent by the mobile device and media information in the broadcast received by the broadcast receiving management unit, and an information transmitting unit, and (d) a television control unit for receiving control information transmitted from the mobile device, and changing the content displayed on the television according to the received control information, where the information transmitting unit is adapted for transmitting the processed media information to the mobile device or the television control unit.

In one embodiment, the terminal connection management unit is further adapted for processing a connection request, saving information of the mobile device and connecting the mobile device to the television if the connection request meets the requirement, or sending feedback information and rejecting the connection request if the connection request does not meet to the requirement.

In one embodiment, the control information of the mobile device includes play and pause, play progress adjustment, last resource, next resource, and volume increasing and decreasing.

In one embodiment, the mobile device display control module includes (a) a television search and connection unit for searching for a television in a network and connecting the mobile device to the television, (b) a media information management unit including an information processing unit and an information transmitting unit, wherein the information processing unit is adapted for receiving and processing media information sent from the television, and the information transmitting unit is adapted for transmitting a processed request command and control information to a television control unit, and (c) an interface display management unit for selectively displaying four interfaces including a video details interface, a star details interface, a type list interface, and a mouse remote control interface.

In one embodiment, the video details interface is a display interface on the mobile device for, when the television plays a movie, a drama, music or news content, displaying basic information, details, and a related content list. The star details interface is adapted for showing basic information, life introduction, and related film and music works of a star. The type list interface is adapted for displaying a list of types of videos, music, or news. The mouse remote control interface is adapted for, when the television is in an APP application or an interface of browsing a webpage, providing options of remote control, mouse, and gravity sensing.

In operation, the information transmitting unit of the mobile device sends a request command to the television for obtaining the media information of the content displayed on the television; the information processing unit of the television receives and processes the request command; the information transmitting unit of the television transmits the media information to the information processing unit of the mobile device; the information processing unit of the mobile device processes the media information; the information transmitting unit of the mobile device sends the processed media information to the interface display management unit; and the interface display management unit requests basic information and a related content resource of the media information from the cloud server, which are displayed on the mobile device.

In addition, when the content displayed on the television is changed, a broadcast is generated. As such, the broadcast receiving management unit of the television receives the broadcast containing media information of the changed content; the information processing unit of the television processes the media information in the broadcast; the information transmitting unit of the television transmits the media information to the information processing unit of the mobile device; the information processing unit of the mobile device processes the received media information; the information transmitting unit of the mobile device sends the media information to the interface display management unit of the mobile device; and the interface display management unit of the mobile device requests basic information and a related content resource of the media information from the cloud server, and changes the interface of the mobile device accordingly.

In one embodiment, the change of the content displayed on the television comprises at least one of:
(a) switching from one to another among applications (APPs) including live television, online movies, online music, online news, browser, and game programs;
(b) switching a channel or a program in live television;
(c) switching a playing video in online videos;
(d) switching a playing music in online music; and
(e) switching broadcast news in online news.

Further, the mobile device can remotely control the content displayed on the television. For example, in operation, the information transmitting unit of the mobile device sends a control command; the information processing unit of the mobile device processes the control command; the information transmitting unit of the mobile device sends the control command to the television; the media information management unit of the television sends the control command to the television control unit after processing the control command; and the television control unit responsively changes the displayed content on the television according to the control command, thereby achieving a remote control of the television control.

In one embodiment, the cloud server is configured to store the media information including electronic program guide (EPG) information of live television, local and online network video and music information, APP information, and control information sent by the mobile device.

In another aspect, the invention relates to an interactive method of a mobile device and a television for displaying content on the mobile device according to that displayed on the television and/or controlling the television by the mobile device. In one embodiment, the interactive method includes searching a television in a network initiated from a mobile device and establishing a connection of the mobile device to the television, obtaining media information of content currently displayed on the television, obtaining basic information and a related content resource of the media information from a cloud server, and displaying the basic information and the related content resource of the media information on an interface of the mobile device.

In one embodiment, the step of searching the television in the network initiated from the mobile device and establishing the connection of the mobile device to the television includes sending, by a television search and connection unit of the mobile device, a user datagram protocol (UDP) packet through multicast transmission to allow all devices under the same port in the network to receive the UDP packet and return a message, so as to determine whether a television is found in the network, if only a television exists in the network, sending a connection request to the television, and if multiple televisions exist in the network, sending a connection request to a television at a choice of the user, processing the connection request by a terminal connection management unit of the television, wherein if the mobile device is to be connected by default, the mobile device is to be successfully connected, if the number of connections has reached a limit value, the connection fails and the failure is fed back to the mobile device, and if the connection request does not meet the requirement, the connection fails and the failure is fed back to the mobile device.

In one embodiment, the step of searching the television in the network initiated from the mobile device and establishing the connection of the mobile device to the television further includes saving device information of the mobile device if the connection request meets the requirement, or sending feedback information and rejecting the connection request if the connection request does not meets the requirement.

In one embodiment, the step of obtaining the media information of the content currently displayed on the television includes sending a request command for requesting the media information of the content currently displayed on the television, by a media information management unit of the mobile device, determining whether the mobile device is connected to the television, by a terminal connection management unit of the television, wherein, if not, the mobile device performs a television search and connection operation, and if yes, a media information management unit of the television processes the request command, obtains name of a program package running on the television and media data in the program and encapsulates them into media information, transmitting the encapsulated media information to a media information management unit of the mobile device, by the media information management unit of the television, processing and transmitting the media information to an interface display management unit of the mobile device, by the media information management unit of the mobile device, and determining a type of the media information, and presenting a corresponding interface of the mobile device, by an interface display management unit of the mobile device.

In one embodiment, the interactive method further includes changing the display content on the mobile device according to a change of the content displayed on the television. The step of changing the display content on the mobile device according to the change of the content displayed on the television includes broadcasting a broadcast when the content displayed on the television is changed, receiving and transmitting the broadcast to a media information management unit of the television, by a broadcast receiving management unit of the television, processing data in the broadcast, encapsulating the processed data into the media information, and transmitting the media information to a media information management unit of the mobile device, by the media information management unit of the television, determining whether a connected mobile device exists, wherein if not, a television search and connection unit of the mobile device performs a television search and connection operation, and if yes, the media information management unit of the mobile device processes and transmits the media information to an interface display management unit of the mobile device, determining a type of the media information, and presenting a corresponding interface, by the interface display management unit of the mobile device.

In another embodiment, the interactive method also includes remotely controlling the television by the mobile device. The step of remotely controlling the television by the mobile device includes sending a control command by the information transmitting unit of the mobile device, and after the information processing unit of the mobile device processes the control command, the information transmitting unit of the mobile device sends the control command to the television, determining whether the mobile device is connected to a television, wherein if not, the mobile device performs a television search and connection operation, and if yes, after receiving the control command, a media information management unit on the television processes the control command, and send the control command to a television control unit, and changing a displayed content on the television according to the command by the television control unit of the television, thereby achieving a remote control of the television.

In one embodiment, the control command of the mobile device includes play and pause, play progress adjustment, last resource, next resource, and volume increasing and decreasing.

In yet another aspect, the present invention relates to a non-transitory computer-readable medium storing instructions which, when executed by one or more processors, cause the interactive system to perform the interactive method, as disclosed above, for displaying content on the mobile device according to that displayed on the television and/or controlling the television by the mobile device.

Briefly, the present invention provides an interactive method and an interactive system of a mobile device and a television. The interactive system includes a television service management module, a mobile device display control module, and a cloud server. After being connected to a television, a mobile device can obtain media information being displayed on the television, and then obtains from the cloud server basic information or a brief introduction, and a related content resource of the media information according to the type and identifier of the media information. Moreover, if the content displayed on the television changes, the television service management module can actively send the changed media information to the mobile device, and the mobile device display control module changes the display content according to the new media information. Meanwhile, the mobile device can also send control information to the television control unit, to achieve a remote control of the television. The interactive method and system of the present invention make the mobile device and the television closely be associated with each other, and enable the mobile device to vary content display along with the television content, so that the user can get detailed information and extension information about the television content all the time. Besides, the interactive method and system also simplify the user's remote control operation, making it convenient for the user to better enjoy the fun brought about by the television.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE INVENTION

Figure 1:
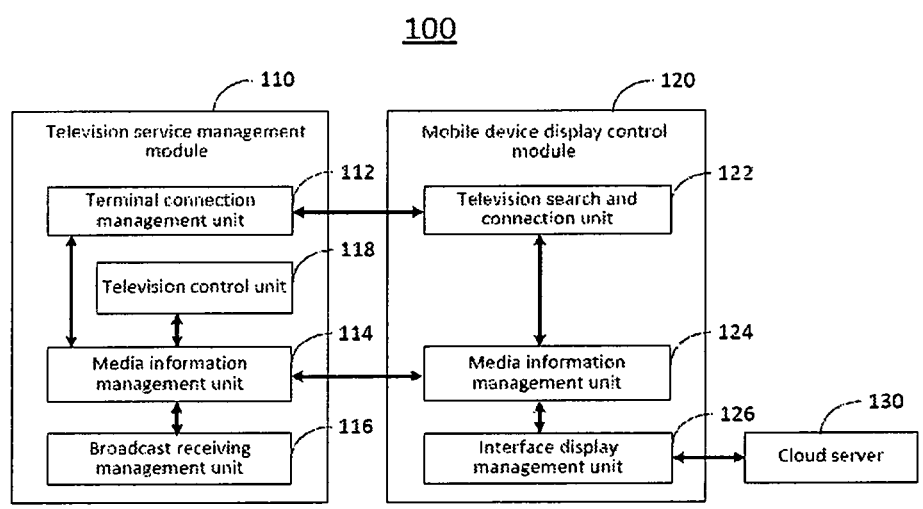
FIG. 1 shows schematically a block diagram of an interactive system of a mobile device and a television according to one embodiment of the present invention.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The description will be made as to the embodiments of the present disclosure in conjunction with the accompanying drawings in FIGS. 1-6. It should be understood that specific embodiments described herein are merely used for explaining the present invention, but are not intended to limit the present invention. In accordance with the purposes of this disclosure, as embodied and broadly described herein, this invention, in one aspect, relates to an interactive system and an interactive method of a mobile device and a television for displaying content on the mobile device according to that displayed on the television and/or controlling the television by the mobile device, and a non-transitory computer-readable medium storing instructions which, when executed by one or more processors, cause the interactive system to perform the interactive method. The mobile device can be, but not limited to, a mobile phone, a personal digital assistant (PDA), a tablet, a game player, a media player, and the like.

Referring to FIG. 1, an interactive system of a mobile device and a television is schematically shown according to one embodiment of the present invention. In this exemplary embodiment, the interactive system 100 includes a television service management module 110 associated with a television, a mobile device display control module 120 associated with a mobile device, and a cloud server 130. The television service management module 110, the mobile device display control module 120 and the cloud server 130 are in communications with each other for displaying content on the mobile device according to that displayed on the television and/or controlling the television by the mobile device.

The television service management module includes a terminal connection management unit 112, a media information management unit 114, a broadcast receiving management unit 116, and a television control unit 118. The terminal connection management unit 112 is configured to manage connection and disconnection of the mobile device to the television and controlling the number of the mobile devices connecting to the television. The terminal connection management unit 112 is further configured to process a connection request, saving information of the mobile device and connect the mobile device to the television if the connection request meets the requirement, or send feedback information and reject the connection request if the connection request does not meet to the requirement. The media information management unit 114 includes an information processing unit and an information transmitting unit. The information processing unit is configured to process a request command sent by the mobile device and media information in the broadcast received by the broadcast receiving management unit. The information transmitting unit is configured to transmit the processed media information to the mobile device or the television control unit 118. The broadcast receiving management unit 116 is responsible for processing a broadcast generated due to a change of content displayed on the television. The television control unit 118 is configured to receive control information transmitted from the mobile device, and change the content displayed on the television according to the received control information.

The change of the content displayed on the television includes, but not limited to, one of the following changes:
(a) switching from one to another among applications (APPs) including live television, online movies, online music, online news, browser, and game programs;
(b) switching a channel or a program in live television;
(c) switching a playing video in online videos;
(d) switching a playing music in online music; and
(e) switching broadcast news in online news.

The media information includes, but not limited to, electronic program guide (EPG) information of live television, local and online network video and music information, APP information, control information sent by the mobile device, and so on. In one embodiment, the EPG information enables users to query programs played on the television throughout the day on a certain date in each television station.

The control information of the mobile device includes, but not limited to, play and pause, play progress adjustment, last resource, next resource, and volume increasing and decreasing.

The mobile device display control module 120 includes a television search and connection unit 122, a media information management unit 124, and an interface display management unit 126. The television search and connection unit 122 is responsible for searching for a television in a network and connecting the mobile device to the television. The network can be a local area network (LAN), an intranet, home network, the internet, or the like. The media information management unit 124 includes an information processing unit and an information transmitting unit. The information processing unit is configured to receive and process the media information sent from the television. The information transmitting unit is configured to transmit the processed request command and control information to the television control unit 118. The interface display management unit 126 is configured to selectively display interfaces comprising, but not limited to, a video details interface, a star details interface, a type list interface, and a mouse remote control interface.

The video details interface is an original display interface on the mobile device, i.e., a secondary screen for the television, when the television plays a movie, a drama, music or news content, and the video details interface shows basic information, details, and a related content list. The star details interface shows basic information, a life introduction, and related film and music works of a star. The type list interface is a display interface of a list of a type of videos, music or news. The mouse remote control interface is an interface that has options such as remote control, mouse, and gravity sensing, when the television is in an APP or browses a webpage.

The cloud server 130 is configured to store the media information including EPG information about live television, local and online network video and music information, APP application information, and control information sent by a mobile device, and the like.

In operation, the television search and connection unit 122 of the mobile device initiates a search for a television in a network, (for example, a LAN under a same router) and sends a connection request to the television. The terminal connection management unit 112 of the television processes data of the connection request, and saves device information of the mobile device if the data meets the requirement, or sends feedback information and rejects the connection if the data does not meet to the requirement.

The information transmitting unit of the mobile device sends a request command to the television for obtaining the media information of the content currently displayed on the television. The information processing unit of the television receives and processes the request command, while the information transmitting unit of the television transmits the media information to the information processing unit of the mobile device. The information processing unit of the mobile device sends the media information to the interface display management unit of the mobile device after processing the information. Then, the interface display management unit of the mobile device requests basic information and a related content resource of the of the media information from the cloud server, which is finally displayed on the interface of the mobile device.

Further, when the content displayed on the television is changed, a broadcast is generated. The broadcast receiving management unit 116 of the television receives the broadcast containing media information of the changed content. The information processing unit of the television processes the media information in the broadcast, while the information transmitting unit of the television transmits the media information to the information processing unit of the mobile device. The information processing unit of the mobile device processes the received media information, and the information transmitting unit of the mobile device sends the media information to the interface display management unit of the mobile device. The interface display management unit 126 of the mobile device requests basic information and a related content resource of the media information from the cloud server, and changes the interface of the mobile device accordingly.

Moreover, the mobile device can remotely control the content displayed on the television. For example, the information transmitting unit of the mobile device sends a control command. After the information processing unit of the mobile device processes the control command, the information transmitting unit of the mobile device sends the processed data of the control command to the television. The media information management unit 114 of the television sends the control command to the television control unit 118 after processing the data of the control command. The television control unit 118 of the television makes a response, to change the displayed content on the television according to the control command, thereby achieving a remote control of the television control.

Figure 2:
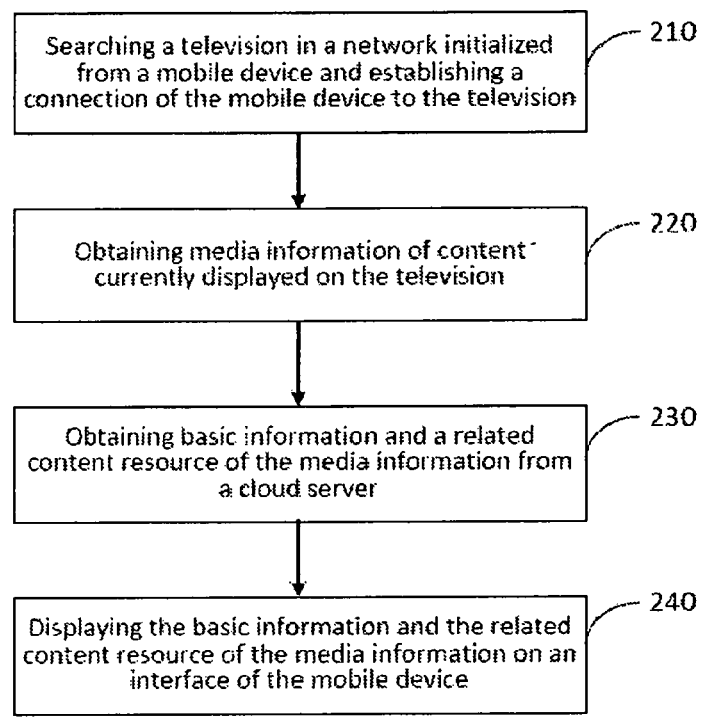
FIG. 2 shows a flowchart of an interactive method of a mobile device and a television according to one embodiment of the present invention.

Referring to FIG. 2, a flowchart of an interactive method of a mobile device and a television is shown according to one embodiment of the present invention. In this embodiment, the method includes the following steps:

At step 210, the mobile device initiates a search for a television in a network. If a television exists in the network, a connection of the mobile device to the television will be established. The network is, but not limited to, a LAN, an intranet, home network, the internet, or the like.

At step 220, the media information of the content currently displayed on the television is obtained by the mobile device. The media information includes, but not limited to, the EPG information of live television, local and online network video and music information, APP information, and control information sent by the mobile device.

At step 230, the basic information and the related content resource of the media information is obtained from a cloud server.

At step 240, the basic information and the related content resource of the media information is displayed on an interface of the mobile device.

Figure 3:
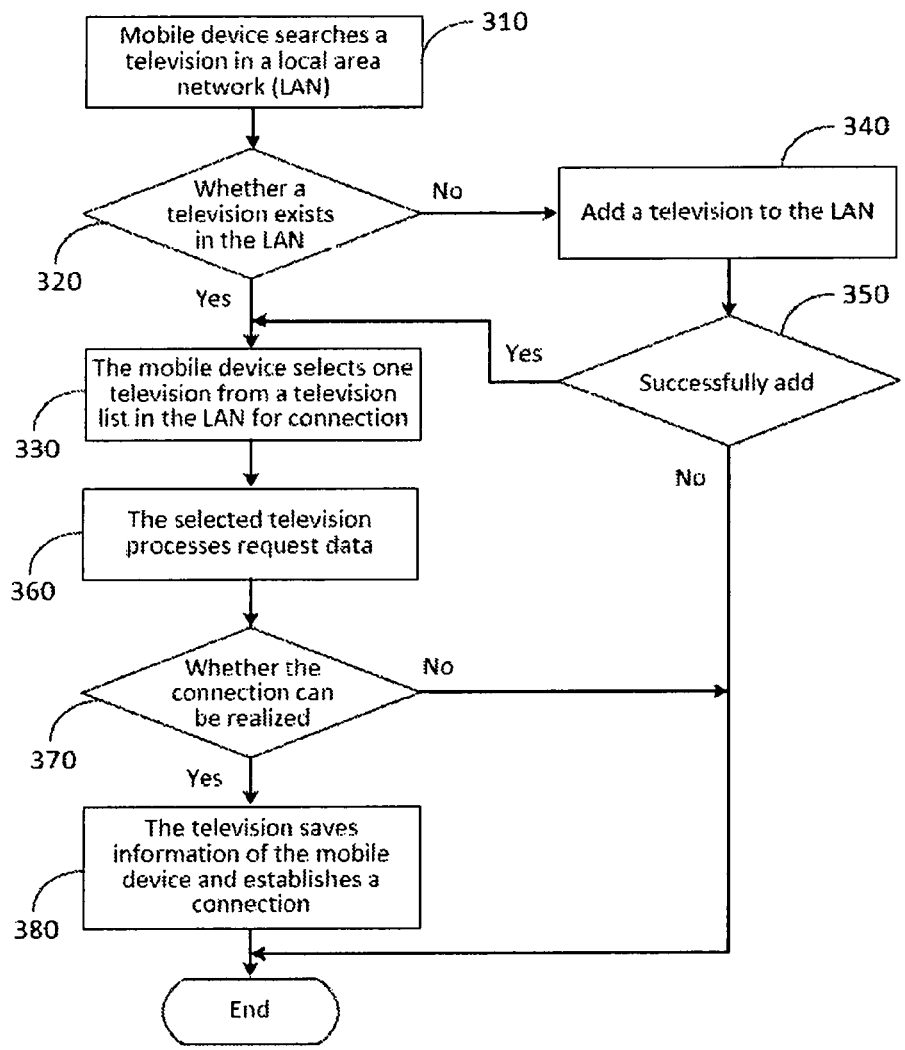
FIG. 3 shows a flowchart of searching a television in a local area network (LAN) initiated from a mobile device and establishing a connection of the mobile device to the television according to one embodiment of the present invention.

Specifically, FIG. 3 shows a flowchart of searching a television in a local area network (LAN) initiated from a mobile device and establishing a connection of the mobile device to the television according to one embodiment of the present invention.

In this operation, a user of a mobile device clicks on, for example, a search button for searching for a television in a network, for example, a LAN. Then, the television search and connection unit of the mobile device searches for a television in the LAN at step 310. The television search and connection unit of the mobile device sends a UDP packet through multicast transmission, all devices under the same port in the network receive the UDP packet and return a message, so as to determine whether a television exists in the LAN at step 320. If one or more televisions exist in the LAN, step 330 is performed; otherwise, step 340 is performed.

At step 330, if only one television exists, the television is automatically selected and a connection request is sent; and if multiple televisions exist, a connection request is sent according to a choice of the user.

At step 360, a terminal connection management unit of the television processes data in the connection request. Then, whether the connection can be realized is performed at step 370. If yes, step 380 is performed sequentially. Otherwise, the search and connection operation is ended. For example, if the mobile device is to be connected by default, the mobile device is to be successfully connected. If the number of connections has reached a limit value, the connection fails and the failure is fed back to the mobile device. If the connection does not meet to the requirement, the connection fails and the failure is fed back to the mobile device. In other cases, the connection with the mobile device is successfully established.

At step 380, the terminal connection management unit of the television saves device information of the mobile device and establishes a connection of the mobile device to the television if the connection request meets the requirement. Otherwise, the terminal connection management unit of the television sends feedback information and rejects the connection request if the connection request does not meet to the requirement.

Additionally, if the searching step (step 310) finds no television in the LAN, a television will be added to the LAN at step 340. If the television is successfully added in the LAN, step 330 is performed; otherwise, the search and connection operation is ended.

Figure 4:
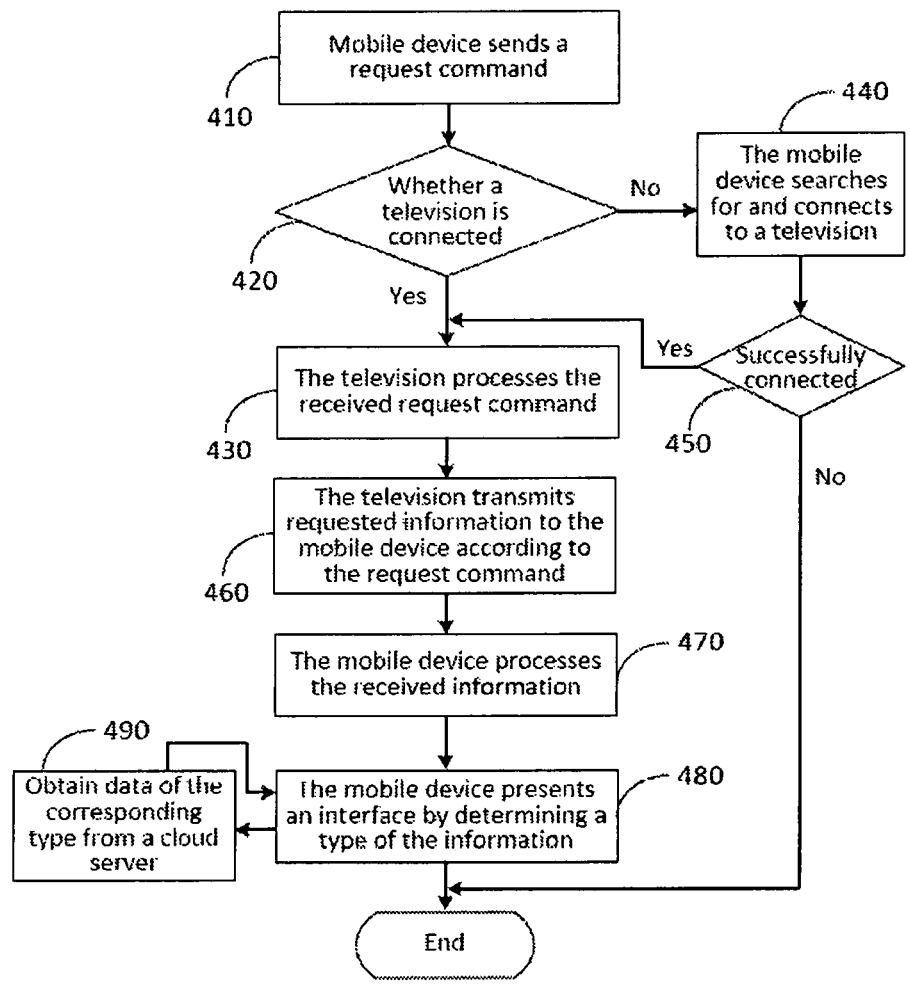
FIG. 4 shows a flowchart of obtaining media information of content currently displayed on a television according to one embodiment of the present invention.

FIG. 4 shows a flowchart of obtaining media information of content currently displayed on a television according to one embodiment of the present invention.

At step 410, the media information management unit of the mobile device sends a request command for requesting the media information of the content currently displayed on the television.

At step 420, whether the mobile device is connected to the television is determined. If no mobile device is connected to the television, the mobile device performs a television search and connection operation at step 440. The process of the television search and connection operation is shown in FIG. 3, and its detailed description is disclosed above and thus omitted herein. If the mobile device is connected to the television, a media information management unit of the television processes the request command, obtains name of a program package running on the television and media data in the program and encapsulates them into media information at step 430. In addition, after step 440 is performed, whether the mobile device is successfully connected to the television is checked at step 450. If yes, step 430 is performed; otherwise, the step of obtaining the media information of the content currently displayed on the television is ended.

At step 460, the media information management unit of the television transmits the encapsulated media information to the media information management unit of the mobile device.

At step 470, the media information management unit of the mobile device processes the received media data, and transmits the data to an interface display management unit of the mobile device.

At step 480, by determining the type of the media data of the media information, the interface display management unit of the mobile device presents a corresponding interface. The interface shows basic information in the media data of the media information. Meanwhile, the interface display management unit of the mobile device requests more detailed information and a related content of the media data from a cloud server for display on the interface at step 490.

Figure 5:
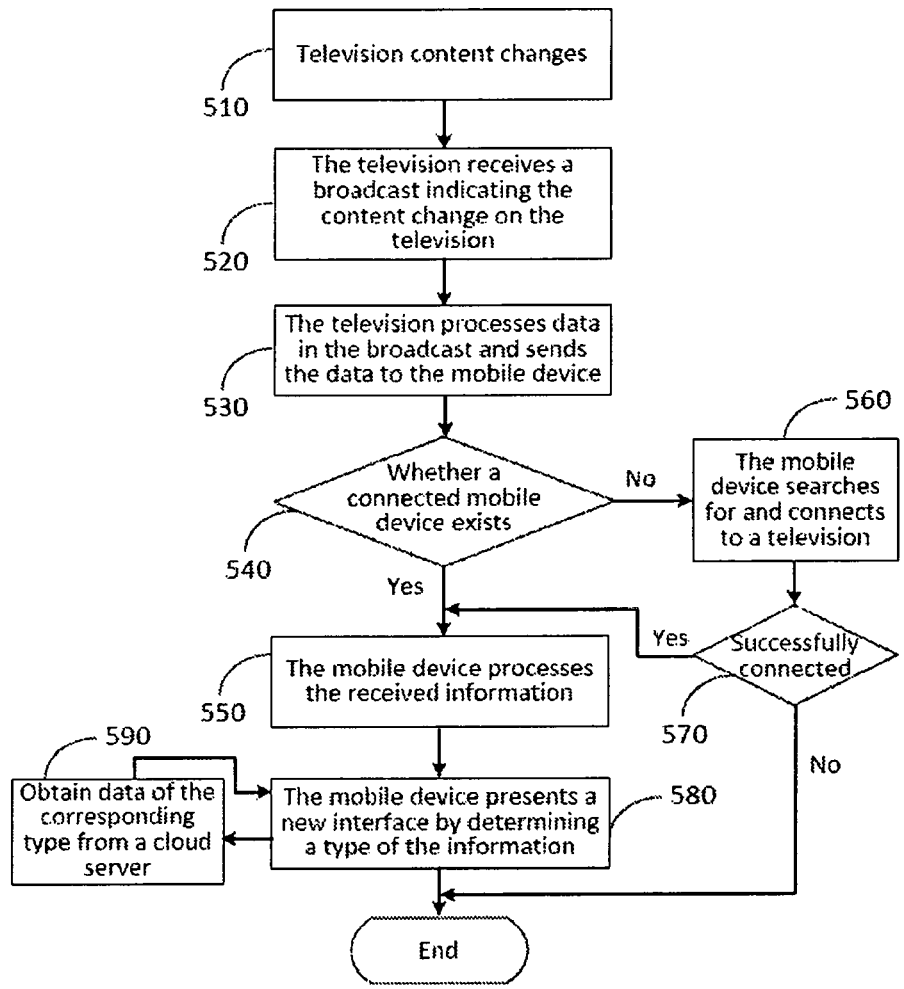
FIG. 5 shows a flowchart of changing display content on a mobile device according to a change of content displayed on a television according to one embodiment of the present invention.

In addition, according to one embodiment of the interactive method, the mobile device enables to change its display content according to a change of the content displayed on the television, whose processes are shown in FIG. 5 and include the following steps.

When the content displayed on the television is changed at step 510, a broadcast is generated. For cases of the changes, please refer to the above description for details.

At step 520, the broadcast receiving management unit of the television receives the broadcast containing media information of the changed content.

At step 530, the information processing unit of the television processes data in the broadcast, and encapsulates the data into media information, while the information transmitting unit of the television transmits the media information to the information processing unit of the mobile device.

At step 540, whether a connected mobile device exists is determined. If yes, step 550 is performed; otherwise, the mobile device performs a television search and connection operation at step 560. The process of the television search and connection operation is shown in FIG. 3, and its detailed description is disclosed above and thus omitted herein. In addition, after step 560 is performed, whether the mobile device is successfully connected to the television is checked at step 570. If yes, step 550 is performed; otherwise, the step of changing the display content on the mobile device according to a change of the content displayed on the television is ended.

At step 550, the media information management unit of the mobile device processes and transmits the media information to an interface display management unit of the mobile device.

At step 580, by determining the type of the media data, the interface display management unit of the mobile device presents a corresponding interface on the display of the mobile device. The interface shows basic information in the media data. Meanwhile, the interface display management unit of the mobile device requests more detailed information and a related content of the media data from a cloud server for display on the interface at step 590.

Figure 6:
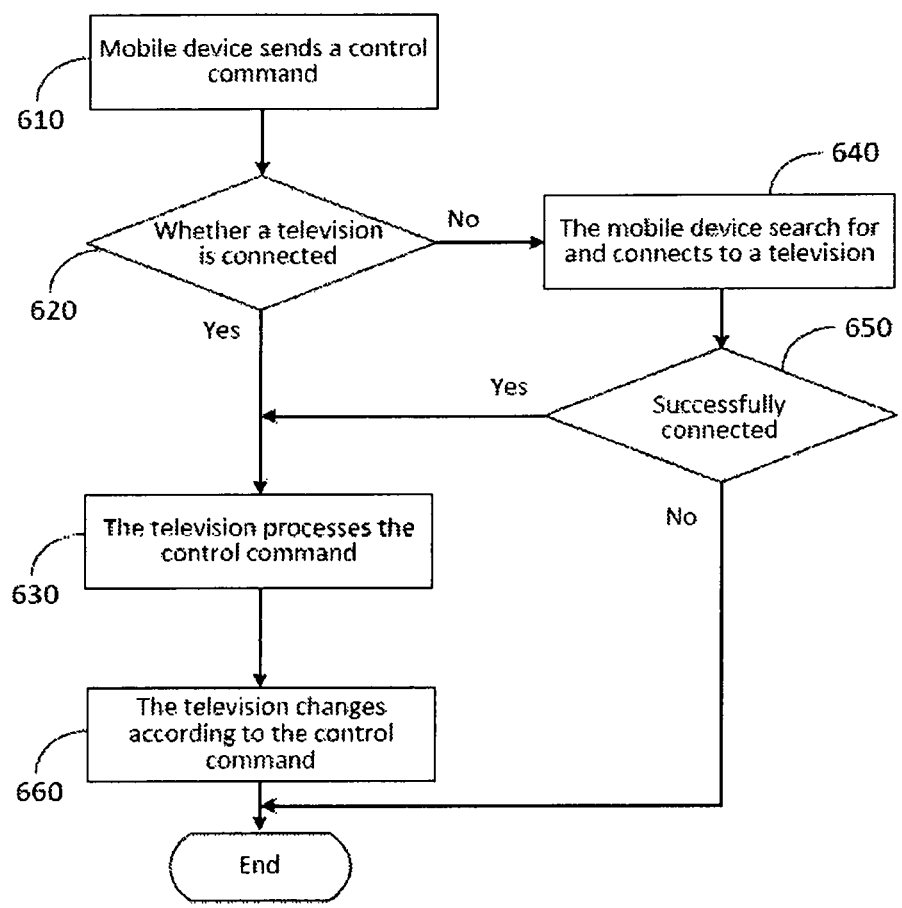
FIG. 6 shows a flowchart of remotely controlling a television by a mobile device according to one embodiment of the present invention.

Further, according to one embodiment of the interactive method, the mobile device enables to remotely control the television, whose processes are shown in FIG. 6 and include the following steps.

At step 610, the information transmitting unit of the mobile device sends a control command. After the information processing unit of the mobile device processes the control command, the information transmitting unit of the mobile device sends the control command to the television. The control command of the mobile device includes, but not limited to, play and pause, play progress adjustment, a last resource, a next resource, and volume increasing and decreasing.

At step 620, whether the mobile device is connected to the television is determined. If yes, step 630 is performed; otherwise, the mobile device performs a television search and connection operation at step 640. The process of the television search and connection operation is shown in FIG. 3, and its detailed description is disclosed above and thus omitted herein. In addition, after step 640 is performed, whether the mobile device is successfully connected to the television is checked at step 650. If yes, step 630 is performed; otherwise, the step of remotely controlling the television by the mobile device is ended.

At step 630, after receiving the control command, a media information management unit of the television processes the control command, and sends the control command to a television control unit.

At step 660, the television control unit of the television changes a displayed content on the television according to the control command, thereby achieving a remote control of the television by the mobile device.

Yet another aspect of the present invention provides a non-transitory tangible computer-readable medium storing instructions or codes which, when executed by one or more processors, cause the above system to perform the above method for pushing the message box. The non-transitory tangible computer-readable storage medium includes, but not limited to, disk, CD-ROM, read-only memory (ROM), random memory (RAM), flash dive, or the likes.

In sum, the present invention provides an interactive method and an interactive system of a mobile device and a television, which is formed by a television service management module, a mobile device display control module, and a cloud server. After being connected to a television, a mobile device can obtain media information being displayed on the television, and then obtains from the cloud server basic information or a brief introduction, and a related content resource of the media information according to the type and identifier of the media information. Moreover, if the content displayed on the television changes, the television service management module can actively send the changed media information to the mobile device, and the mobile device display control module changes the display content according to the new media information. Meanwhile, the mobile device can also send control information to the television control unit, to achieve the television control effect. The interactive method and system of the present invention makes the mobile device and the television closely associated, and enables the mobile device to vary along with the television content, so that the user can get detailed information and extension information about the television content all the time. Besides, the interactive method and system also simplifies the user's remote control operation, making it convenient for the user to better enjoy the fun brought about by the television.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

The invention claimed is:

1. An interactive system of a mobile device and a television, comprising:
   a mobile device display control module associated with the mobile device;
   a first processor in the mobile device;
   a first storage in the mobile device;
   a television service management module associated with the television;
   a second processor in the television;
   a second storage in the television; and
   a cloud server,
   wherein the mobile device display control module, the television service management module and the cloud server are in communications with each other for displaying content on the mobile device according to that displayed on the television and/or controlling the television by the mobile device;
   the mobile device display control module comprises the following units stored in the first storage and performed by first processor:
      a television search and connection unit configured to search for a television in a network and connect the mobile device to the television;
      an information transmitting unit configured to send a request command to the television for obtaining the media information of the content currently displayed on the television;
      an information processing unit configured to receive and process media information sent from the television; and
      an interface display management unit configured to request basic information and a related content resource of the media information from the cloud server, which are displayed on the mobile device, determine a type of the media information, and present a corresponding interface of the mobile device;
   the television service management module comprises the following units stored in the second storage and performed by the second processor:
      a terminal connection management unit configured to manage connection and disconnection of the mobile device to the television and control the number of the mobile devices connecting to the television;
      an information process unit configured to processes the request command from the mobile device, obtain name of a program package running on the television and media data in the program and encapsulates them into media information; and
      an information transmitting unit configured to transmit the encapsulated media information to the mobile device to the mobile device.

2. The interactive system of claim 1, wherein the television service management module further comprises the following units stored in the first storage and performed by the first processor:
   a broadcast receiving management unit configured to process a broadcast generated due to a change of content displayed on the television; and
   a television control unit configured to receive control information transmitted from the mobile device, and change the content displayed on the television according to the received control information,
   wherein the information processing unit configured to process media information in the broadcast received by the broadcast, and the information transmitting unit is configured to transmit the processed media information to the mobile device or the television control unit.

3. The interactive system of claim 2, wherein the terminal connection management unit is further adapted for processing a connection request, saving information of the mobile device and connecting the mobile device to the television if the connection request meets the requirement, or sending feedback information and rejecting the connection request if the connection request does not meet to the requirement.

4. The interactive system of claim 2, wherein:
   the information processing unit is configured to receive and process media information sent from the television, and the information transmitting unit is configured to transmit a processed request command and control information to the television control unit; and
   the interface display management unit is configure to selectively display interfaces comprising a video details interface, a star details interface, a type list interface, and a mouse remote control interface.

5. The interactive system of claim 4, wherein, in operation,
   the information transmitting unit of the mobile device sends a request command to the television for obtaining the media information of the content displayed on the television;
   the information processing unit of the television receives and processes the request command;
   the information transmitting unit of the television transmits the media information to the information processing unit of the mobile device;
   the information processing unit of the mobile device processes the media information;
   the information transmitting unit of the mobile device sends the processed media information to the interface display management unit; and
   the interface display management unit requests basic information and a related content resource of the media information from the cloud server, which are displayed on the mobile device.

6. The interactive system of claim 4, wherein, in operation, when the content displayed on the television is changed, a broadcast is generated, wherein
   the broadcast receiving management unit of the television receives the broadcast containing media information of the changed content;
   the information processing unit of the television processes the media information in the broadcast;
   the information transmitting unit of the television transmits the media information to the information processing unit of the mobile device;
   the information processing unit of the mobile device processes the received media information;
   the information transmitting unit of the mobile device sends the media information to the interface display management unit of the mobile device; and
   the interface display management unit of the mobile device requests basic information and a related content resource of the media information from the cloud server, and changes the interface of the mobile device accordingly.

7. The interactive system of claim 4, wherein, in operation,
the information transmitting unit of the mobile device sends a control command;
the information processing unit of the mobile device processes the control command;
the information transmitting unit of the mobile device sends the control command to the television;
the media information management unit of the television sends the control command to the television control unit after processing the control command; and
the television control unit responsively changes the displayed content on the television according to the control command, thereby achieving a remote control of the television control.

8. The interactive system of claim 4, wherein the cloud server is configured to store the media information comprising electronic program guide (EPG) information of live television, local and online network video and music information, APP information, and control information sent by the mobile device.

9. An interactive method of a mobile device and a television for displaying content on the mobile device according to that displayed on the television and/or controlling the television by the mobile device, comprising:
(a) searching a television in a network initiated from a mobile device and establishing a connection of the mobile device to the television;
(b) obtaining media information of content currently displayed on the television;
(c) obtaining basic information and a related content resource of the media information from a cloud server; and
(d) displaying the basic information and the related content resource of the media information on an interface of the mobile device;
wherein the step of obtaining the media information of the content currently displayed on the television comprises:
(b1) sending a request command for requesting the media information of the content currently displayed on the television, by the mobile device;
(b2) determining whether the mobile device is connected to the television, by a the television, wherein, if not, the mobile device performs a television search and connection operation, and if yes, the television processes the request command, obtains name of a program package running on the television and media data in the program and encapsulates them into media information;
(b3) transmitting the encapsulated media information to the mobile device, by the television;
(b4) processing the media information by the mobile device; and
(b5) determining a type of the media information, and presenting a corresponding interface of the mobile device, by the mobile device.

10. The interactive method of claim 9, wherein the step of searching the television in the network initiated from the mobile device and establishing the connection of the mobile device to the television comprises:
sending, by the mobile device, a user datagram protocol (UDP) packet through multicast transmission to allow all devices under the same port in the network to receive the UDP packet and return a message, so as to determine whether a television exists in the network;
if only a television exists in the network, sending a connection request to the television, and if multiple televisions exist in the network, sending a connection request to a television at a choice of the user;
processing the connection request by the television, wherein
if the mobile device is to be connected by default, the mobile device is to be successfully connected;
if the number of connections has reached a limit value, the connection fails and the failure is fed back to the mobile device; and
if the connection request does not meet the requirement, the connection fails and the failure is fed back to the mobile device.

11. The interactive method of claim 10, wherein the step of searching the television in the network initiated from the mobile device and establishing the connection of the mobile device to the television further comprises
saving device information of the mobile device if the connection request meets the requirement, or
sending feedback information and rejecting the connection request if the connection request does not meets the requirement.

12. The interactive method of claim 9, further comprising:
changing the display content on the mobile device according to a change of the content displayed on the television; or
remotely controlling the television by the mobile device.

13. The interactive method of claim 12, wherein the step of changing the display content on the mobile device according to the change of the content displayed on the television comprises:
(a) broadcasting a broadcast when the content displayed on the television is changed;
(b) receiving the broadcast by the television;
(c) processing data in the broadcast, encapsulating the processed data into the media information, and transmitting the media information to the mobile device, by the television;
(d) determining whether a connected mobile device exists, wherein if not, the mobile device performs a television search and connection operation, and if yes, the mobile device processes and transmits the media information to an interface display management unit of the mobile device; and
(e) determining a type of the media information, and presenting a corresponding interface, by the mobile device.

14. The interactive method of claim 12, wherein the step of remotely controlling the television by the mobile device comprises:
(a) sending a control command by the mobile device, and after the mobile device processes the control command, the mobile device sending the control command to the television;
(b) determining whether the mobile device is connected to a television, wherein if not, the mobile device performs a television search and connection operation, and if yes, after receiving the control command, the television processes the control command, and sends the control command to a television control unit; and
(c) changing a displayed content on the television according to the control command by the television, thereby achieving a remote control of the television.

15. A non-transitory computer-readable medium storing instructions which, when executed by one or more processors, cause a system to perform an interactive method of a mobile device and a television for displaying content on the mobile device according to that displayed on the television and/or controlling the television by the mobile device, the method comprising:
(a) searching a television in a network initiated from a mobile device and establishing a connection of the mobile device to the television;
(b) obtaining media information of content currently displayed on the television;
(c) obtaining basic information and a related content resource of the media information from a cloud server; and
(d) displaying the basic information and the related content resource of the media information on an interface of the mobile device;
wherein the step of obtaining the media information of the content currently displayed on the television comprises:
(b1) sending a request command for requesting the media information of the content currently displayed on the television, by the mobile device;
(b2) determining whether the mobile device is connected to the television, by the television, wherein, if not, the mobile device performs a television search and connection operation, and if yes, the television processes the request command, obtains name of a program package running on the television and media data in the program and encapsulates them into media information;
(b3) transmitting the encapsulated media information to the mobile device, by the television;
(b4) processing the media information by the mobile device; and
(b5) determining a type of the media information, and presenting a corresponding interface of the mobile device, by the mobile device.

16. The non-transitory computer-readable medium of claim 15, wherein the step of searching the television in the network initiated from the mobile device and establishing the connection of the mobile device to the television comprises:
sending, by the mobile device, a user datagram protocol (UDP) packet through multicast transmission to allow all devices under the same port in the network to receive the UDP packet and return a message, so as to determine whether a television is found in the network;
if only a television exists in the network, sending a connection request to the television, and if multiple televisions exist in the network, sending a connection request to a television at a choice of the user;
processing the connection request by the television, wherein if the mobile device is to be connected by default, the mobile device is to be successfully connected;
if the number of connections has reached a limit value, the connection fails and the failure is fed back to the mobile device; and
if the connection request does not meet the requirement, the connection fails and the failure is fed back to the mobile device.

17. The non-transitory computer-readable medium of claim 15, wherein the interactive method further comprises:
changing the display content on the mobile device according to a change of the content displayed on the television,
wherein the step of changing the display content on the mobile device according to the change of the content displayed on the television comprises:
broadcasting a broadcast when the content displayed on the television is changed;
receiving the broadcast by the television;
processing data in the broadcast, encapsulating the processed data into the media information, and transmitting the media information to a media information management unit of the mobile device, by the television;
determining whether a connected mobile device exists, wherein if not, the mobile device performs a television search and connection operation, and if yes, the mobile device processes and transmits the media information to the mobile device; and
determining a type of the media information, and presenting a corresponding interface, by the mobile device; and
obtaining detailed information and a related content of the media information from a cloud server for display on the corresponding interface of the mobile device.

18. The non-transitory computer-readable medium of claim 15, wherein the interactive method further comprises:
remotely controlling the television by the mobile device, wherein the step of remotely controlling the television by the mobile device comprises:
sending a control command by the mobile device, and after the mobile device processes the control command, the mobile device sends the control command to the television;
determining whether the mobile device is connected to a television, wherein if not, the mobile device performs a television search and connection operation, and if yes, after receiving the control command, the television processes the control command; and
changing a displayed content on the television according to the command by the television, thereby achieving a remote control of the television.

* * * * *